June 2, 1931. C. E. HUNTER 1,808,039
VEHICLE HEAD LAMP ADJUSTING APPARATUS
Filed July 10, 1930 2 Sheets-Sheet 1
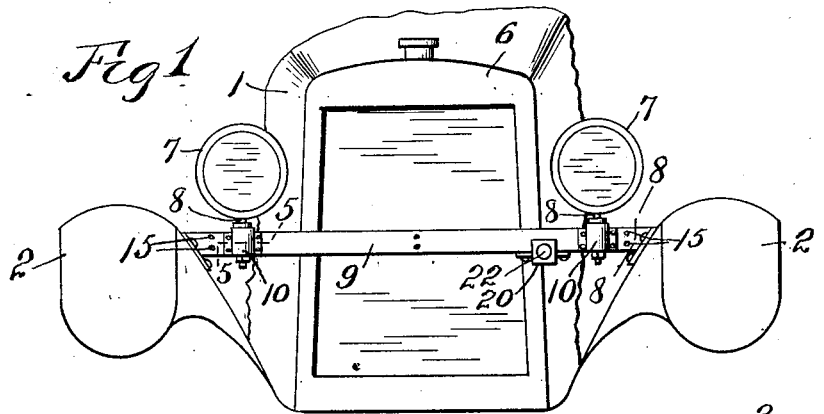
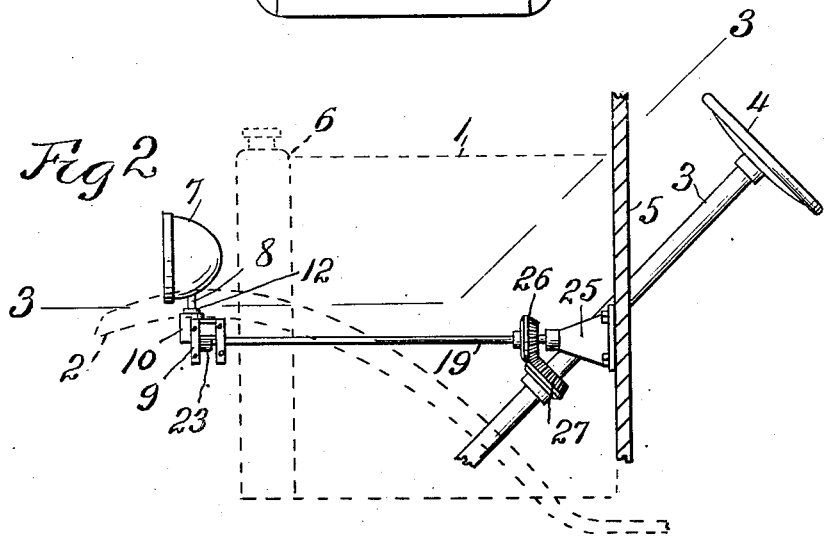
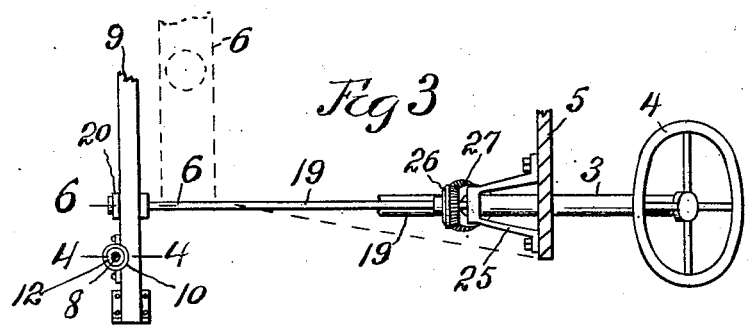
Witness
H. Vernon Olson
INVENTOR
Claud E. Hunter
BY Warren D. House.
His ATTORNEY June 2, 1931. C. E. HUNTER 1,808,039
VEHICLE HEAD LAMP ADJUSTING APPARATUS
Filed July 10, 1930  2 Sheets-Sheet 2
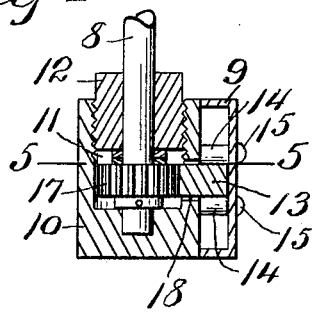
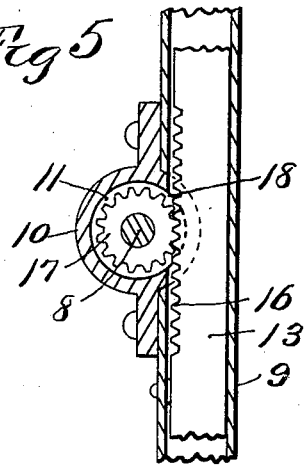
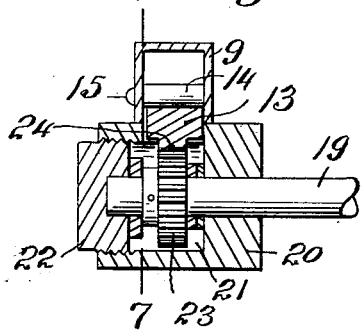
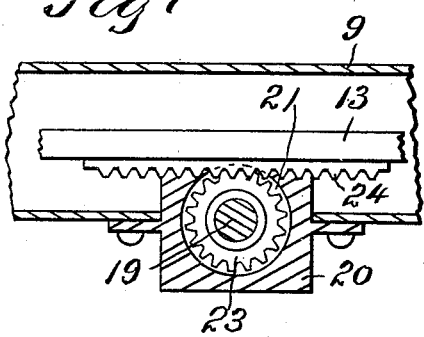
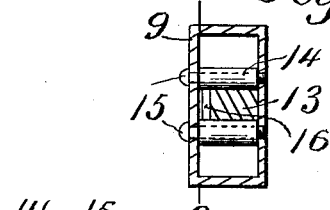
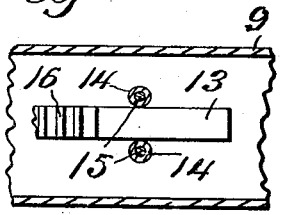
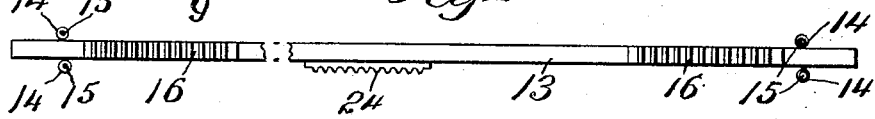
INVENTOR
Claud E. Hunter
BY Warren D. House,
His ATTORNEY
Witness
H. Vernon Olson Patented June 2, 1931

1,808,039

UNITED STATES PATENT OFFICE

CLAUD E. HUNTER, OF PECULIAR, MISSOURI

VEHICLE HEADLAMP ADJUSTING APPARATUS

Application filed July 10, 1930. Serial No. 466,978.

My invention relates to improvements in vehicle headlamp adjusting apparatus.

One of the objects of my invention is to provide novel apparatus by which the headlamps of an automotive vehicle are turned simultaneously with and by the steering wheel of the vehicle, and in directions corresponding to the directions in which the vehicle is turned by the steering wheel.

A further object of my invention is to provide an apparatus of the kind described, which is simple, cheap, strong, durable, not likely to get out of order, which is easily applied to cars now in use, and which is efficient in its operation.

The novel features of my invention are hereinafter fully described and claimed.

In the accompanying drawings, which illustrate the preferred embodiment of my invention, Fig. 1 is a front elevation of my improved apparatus shown applied to an automobile.

Fig. 2 is a side elevation of the apparatus shown attached to a vehicle and connected with the vehicle steering post.

Fig. 3 is a section on the line 3—3 of Fig. 2.

Fig. 4 is an enlarged section on the line 4—4 of Fig. 3.

Fig. 5 is an enlarged section on the line 5—5 of Fig. 1, and is also a section on the line 5—5 of Fig. 4.

Fig. 6 is an enlarged section on the line 6—6 of Fig. 3.

Fig. 7 is a section on the line 7—7 of Fig. 6.

Fig. 8 is an enlarged section on the line 8—8 of Fig. 1.

Fig. 9 is a section on the line 9—9 of Fig. 8.

Fig. 10 is a front elevation, partly broken away, of the reciprocative rack.

Similar reference characters designate similar parts in the different views.

1 designates the usual body of an automobile having the usual fenders 2, steering post 3, steering wheel 4, dashboard 5 and radiator 6.

7 designates two head lamps which are respectively fastened to and are oscillative with two vertical shafts 8, which are oscillative on their axes on a suitable support, which, as shown, is a horizontal tube 9 which extends transversely in front of the radiator 6, and the ends of which are bolted or otherwise fastened respectively to the fenders 2, said two shafts 8 being respectively oscillative in two bearings 10 mounted on the front side of the tube 9.

Each bearing 10 has in its upper end a cylindrical threaded hole 11, Fig. 4, in which is removably fitted a screw plug 12, having a central hole through which extends the adjacent shaft 8.

Reciprocative in the tube 9 is a horizontal rack 13, which is mounted between rollers 14, some above, and some below the rack 13, and respectively mounted on transverse pins 15 which extend transversely through the tube 9, Figs. 4 and 6 to 10.

Adjacent to its ends the rack 13 is provided with two rows of teeth 16, disposed on the front side of the rack 13, and respectively meshing with two pinions 17 respectively fastened on and oscillative with the shafts 8, and located in the bearings 10. The rear sides of the bearings 10 are respectively provided with slots 18 through which respectively extend the front edge portion of the rack 13.

For reciprocating the rack 13 so as to oscillate the headlamps 7 in directions corresponding to the directions that the steering gear, through the steering wheel 4 and post 3 turns the car, the following described mechanism is provided.

A rearwardly extending shaft 19 has its forward end oscillatively mounted in a bearing 20, secured to the under side of the tube 9, Figs. 1, 3, 6 and 7, the forward end of which bearing is provided with a cylindrical hole 21 in which is fitted a screw plug 22.

Located in the hole 21 is a pinion 23 which is fastened to and oscillative with the shaft 19, and which meshes with a row of teeth 24 provided on the under side of the rack 13, Figs. 6, 7 and 10.

The rear end of the shaft 19 is oscillatively mounted in a bearing 25 fastened to the forward side of the dashboard 5, Figs. 2 and 3.

Two bevel gear wheels 26 and 27 are respectively fastened on and oscillative with the shaft 19 and the steering post 3. The arrangement of the pinions 17 and 23, and the gear wheels 26 and 27 is such that the headlamps 7 will be turned in the directions in which the steering gear turns the car. If the wheel 4 is turned clock-wise to turn the car to the right, the headlamps 7 will be turned toward the right, and if the wheel is turned counterclockwise, the headlamps will be turned to the left, through the intermediancy of the gear wheels 26 and 27, shaft 19, pinion 23, rack 13, pinions 17 and shafts 8. When the steering wheel 4 is disposed for straight ahead driving, the headlamps will be correspondingly faced thereby straight ahead.

By having the bearing 25 mounted on the dashboard 5, a rigid support is provided for the rear end of the shaft 19, thus preventing cramping and eliminating friction when the steering post is oscillated.

The tubular support 9 in addition to its function as a support for the rack 13, also serves as a brace for the fenders 2, as a support for the headlamps 7, and as a support for the bearing 20, which supports the front end of the shaft 19.

The bearings 10 and 20 serve as closed grease containers into which grease may be placed, upon removing the plugs 12 and 22, and without the use of a grease gun.

I do not limit my invention to the structure shown and described, as many modifications of my invention, within the scope of the appended claims, may be made without departing from the spirit of my invention.

What I claim is:—

1. In an apparatus of the kind described, the combination with the fenders of a vehicle, of a horizontal tube having its ends respectively supported on said fenders, a bearing mounted on said tube, a vertical shaft oscillative on its axis in said bearing, a head lamp carried by and oscillative with said shaft, a rack reciprocative in said tube, a pinion fastened to and oscillative with said shaft and meshing with said rack, and means for reciprocating said rack.

2. In an apparatus of the kind described, the combination with the fenders and steering gear of a vehicle, of a horizontal tube having its ends respectively supported on said fenders, a bearing on said tube, a vertical shaft oscillative on its axis in said bearing, a headlamp carried by and oscillative with said shaft, a rack reciprocative in said tube, a pinion fastened on and oscillative with said shaft and meshing with said rack, and means connecting said steering gear and said rack by which the latter is reciprocated so as to turn said head lamp in the directions said steering gear turns said vehicle.

3. In an apparatus of the kind described, the combination with the fenders and steering gear of a vehicle, of a horizontal tube supported at its ends respectively on said fenders, a bearing on said tube, a vertical shaft oscillative on its axis in said bearing, a head lamp carried by and oscillative with said shaft, a rack reciprocative in said tube, a pinion fastened on and oscillative with said shaft and meshing with said rack, a second shaft oscillative, a second pinion fastened to and oscillative with said second shaft and meshing with said rack, and means connecting said second shaft with said steering gear by which said second shaft is oscillated in directions such as to effect the turning of said headlamp in the directions in which said steering gear turns said vehicle.

4. In an apparatus of the kind described, the combination with the fenders, dashboard and steering post of a vehicle, of a support attached to and supported by and bracing said fenders, a head lamp oscillative on said support, a shaft, a bearing carried by said support and oscillatively supporting the front end of said shaft, a bearing fastened to said dashboard and oscillatively supporting the rear end of said shaft, means actuated by said steering post for oscillating said shaft, and means actuated by said shaft for oscillating said head lamp.

5. In an apparatus of the kind described, the combination with the fenders, dashboard and steering post of a vehicle, of a support attached to and supported by and bracing said fenders, a head lamp oscillative on said support, a member longitudinally reciprocative on said support, means actuated by said member for oscillating said head lamp, a bearing carried by said support, a bearing fastened to said dashboard, a shaft oscillative in said bearings, means actuated by said shaft for reciprocating said member, and means actuated by said steering post for oscillating said shaft.

6. In an apparatus of the kind described, the combination with a dashboard, steering post and fenders of a vehicle, of a support attached to and supported by and bracing said fenders, a rack longitudinally reciprocative on said support, a bearing on said support, a bearing fastened to said dashboard, a shaft oscillative in said bearings, means connecting said steering post and said shaft for oscillating the latter when said steering post is oscillated, a pinion on and rotative with said shaft and meshing with said rack, a head lamp, means on said support oscillatively supporting said head lamp, and a pinion engaging and oscillated by said head lamp supporting means and meshing with said rack and oscillative with said head lamp.

7. In an apparatus of the kind described, the combination with a dashboard, the fenders and an oscillative steering post of a vehicle, of a support attached to, supported by and bracing said fenders, a rack longitudinally reciprocative on said support, a bearing carried by said support and having a hole in one end, a closure means for the open end of said hole, a bearing fastened to said dashboard, a shaft oscillative in said bearings, means connecting said steering post and said shaft for oscillating the latter, a head lamp, means for oscillatively supporting said head lamp on said support, means actuated by said rack for oscillating said head lamp, and a pinion in said hole, meshing with said rack and secured on and oscillative with said shaft.

In testimony whereof I have signed my name to this specification.

CLAUD E. HUNTER.